Sept. 11, 1934.　　　H. F. MAYNES　　　1,973,686
FISHING REEL
Filed June 25, 1934　　3 Sheets-Sheet 2

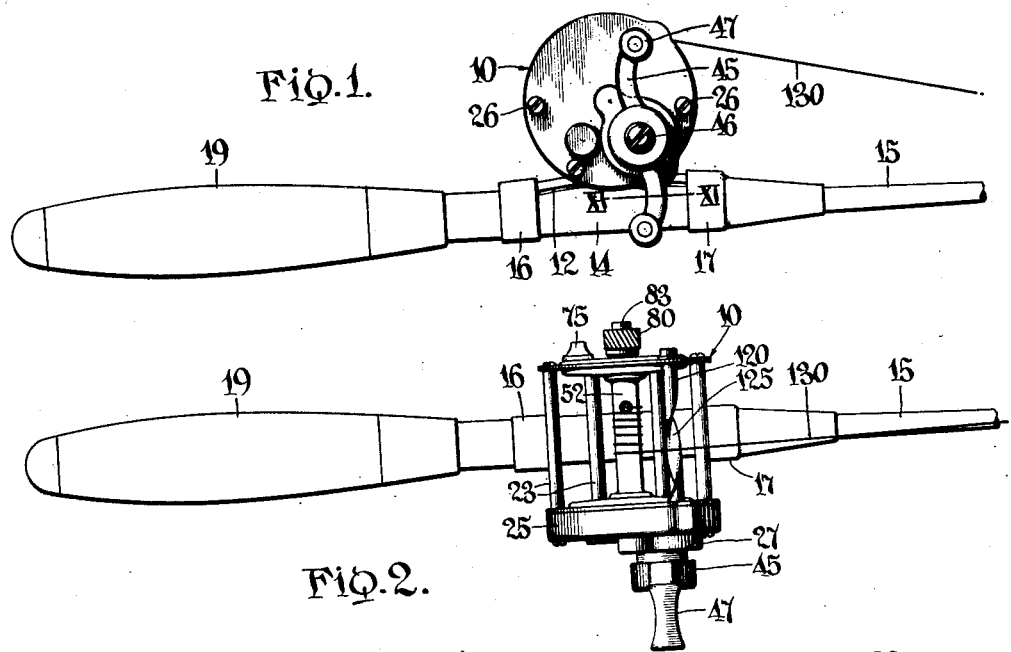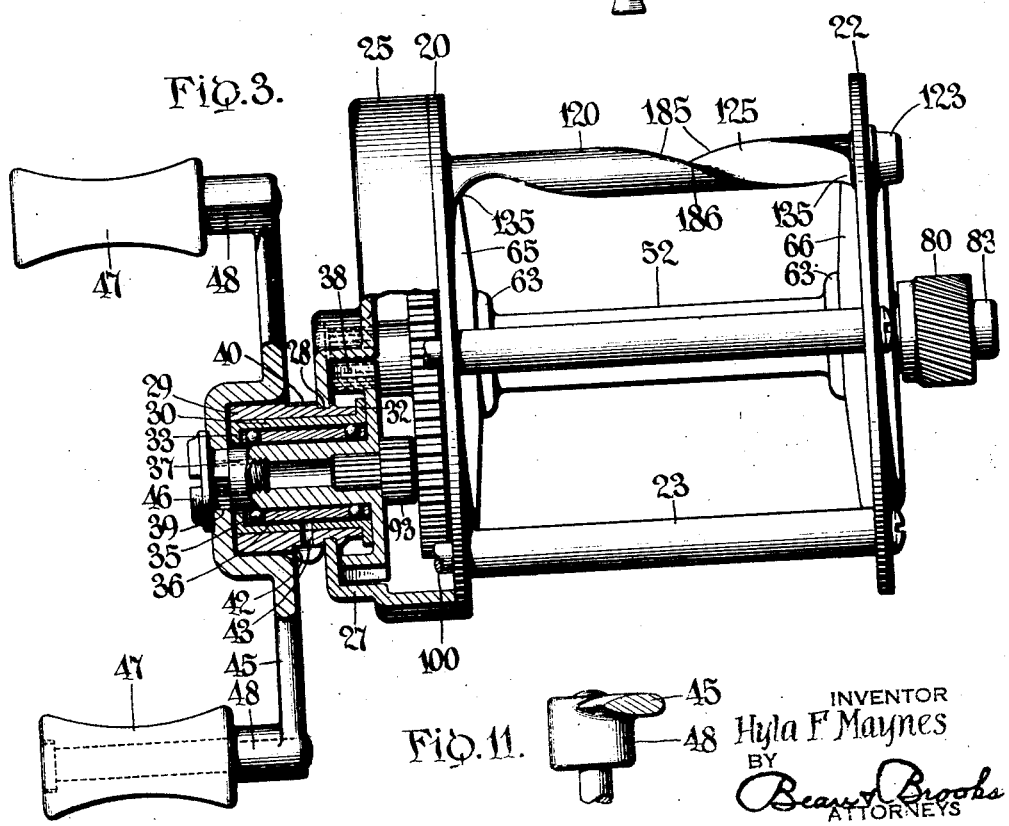

INVENTOR
Hyla F. Maynes
BY
Beau & Brooks.
ATTORNEYS

Sept. 11, 1934.   H. F. MAYNES   1,973,686
FISHING REEL
Filed June 25, 1934   3 Sheets-Sheet 3

INVENTOR
Hyla F. Maynes
BY
Beau Brooks
ATTORNEYS

Patented Sept. 11, 1934

1,973,686

UNITED STATES PATENT OFFICE 1,973,686

FISHING REEL

Hyla F. Maynes, North Tonawanda, N. Y., assignor of one-half to Emma C. Maynes, North Tonawanda, N. Y.

Application June 25, 1934, Serial No. 732,372

19 Claims. (Cl. 242—84.4)

This invention relates to fishing reels, and it has particular relation to an improved level wind mechanism incorporated in the reel, together with mechanism for controlling the back lash of the reel.

One object of the invention is to provide a fishing reel in which a level wind mechanism is geared to such favorable ratio that it exerts minimum load upon the operating members of the reel structure.

Another object of the invention is to provide a fishing reel in which an improved level wind mechanism is adapted to guide the fishing line while reeling off or playing out the line, as well as while reeling it in.

Another object of the invention is to provide a fishing reel in which a level wind mechanism is provided in the form of a spiral reversible member which is rotatable to guide the fishing line from side to side on the spool of the reel, but is so formed that the line operates smoothly over a guiding surface without imparting appreciable rotative force to the member.

Another object of the invention is to provide a level wind mechanism for fishing reels which does not positively engage the line and about which such line may whip freely during casting operations without interfering with such casting operations, but on the other hand automatically guides the line from side to side of the reel spool when it is reeled in or when the line is played out slowly.

Another objection of the invention is to provide a fishing reel having an improved type of back lash arrester.

In the construction of fishing reels of the general type at present being used by anglers, the level wind mechanism incorporated therein includes a shaft partially inclosed to protect it from the elements, and it has intersecting reverse screw threads thereon for engaging a traveller carriage that is in the form of a nut or sleeve and which travels axially upon, and automatically reverses itself at opposite ends of, the screwthreaded shaft. The axially movable carriage is provided with a guide, usually in the form of a pair of small prongs or a slot like loop through which the fishing line is trained, and another guide is necessary to prevent the carriage, during its axial movement from rotating upon the screwthreaded shaft.

In this kind of construction of known level wind mechanism, the gear ratio between the reel crank and the screwthreaded shaft is unfavorable and, because of this fact, an undesirable drag is imposed upon the reel spool and gears of the reel, especially during casting operations. It has been common practice in known constructions of reels to gear the crank to the level wind shaft in such relation that the shaft rotates at approximately crank speed, or in many instances at greater speed than the speed of rotation of the crank.

This kind of mechanism is adversely affected to a great degree by rain or other moisture, and by foreign matter, such as sand or grit, as well as by the high speed to which it is subjected. Therefore, in previously known reels, there has been extensive provision made for disassembling the level wind mechanism from the other parts of the reel in order that it may be cleaned and oiled. Otherwise, the reel assembly will not operate efficiently in practice. Despite the provisions made for the oiling and cleaning of the mechanism, the carriage is subjected to excessive wear and becomes loose in its supporting members.

The so-called pawl of the carriage which operates in the screw grooves of the shaft is subjected to such excessive wear that certain manufacturers embody an extra assembly of pawl in the reel head in order that it may be constantly available to replace the one likely to fail. In order that the carriage may have proper space for operation the reel heads or end plates must be disposed appreciable distances beyond the path of travel of the carriage toward the ends of the reel, and hence, the line winding space of the spool is considerably limited with respect to the entire length of the reel.

The line guiding member of the carriage confines the line in such manner that the latter cannot whip freely laterally from end to end of the spool when such line is played out rapidly incidental to casting operations. Hence, the line is somewhat retarded and the maximum casting distance is not as great as it should be if the line were free from the guiding means. The fact that the level wind shaft includes the carriage and a guide to prevent carriage rotation renders it clear that the force required to operate these members must necessarily be subtracted from the force that would otherwise be available to increase the casting distance. Hence, such level wind mechanisms are not utilized in tournament casting.

The present invention aims to obviate all of the disadvantages specified above and also to obviate the parts subject to such disadvantages.

At the same time, the invention provides for a much simpler and more compact construction, in that the same line winding space is available with much less distance between the reel heads than that previously provided in prior devices. The actuating parts are confined in a compartment protected from the elements wherein they can be properly oiled and minimum dismantling is required. The speed of actuation of the level wind mechanism is also greatly reduced.

In the drawings:

Fig. 1 is a fragmentary side elevation of a fishing rod having a reel, constructed according to the invention, mounted thereon;

Fig. 2 is a plan of the structure shown in Fig. 1;

Fig. 3 is a side elevation, on a larger scale, of the fishing reel wherein portions of the structure are broken away and shown in cross section for the sake of clearness;

Fig. 11 is a cross section taken substantially along the line XI—XI of Fig. 1.

Figure 4:
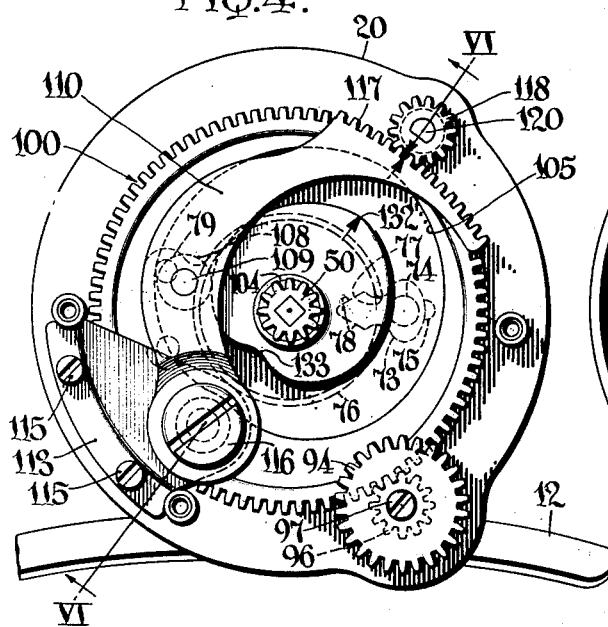
Fig. 4 is a side elevation of a portion of the operating mechanism of the reel.

A reel 10 including the improvements of the invention is provided with a saddle 12 rigidly mounted thereon and carried in an operative position upon a seating portion 14 of a rod 15. Suitable fastening devices 16 and 17 demountably secure the saddle upon the seating portion of the rod at a location conveniently spaced from the rear or handle 19 of the rod.

The reel 10 comprises a pair of parallel end plates 20 and 22 rigidly secured in spaced relation by means of bracing members 23 rigidly secured about opposed edges thereof and providing a rigid support for the saddle 12. One of the plates 20 has a cup shaped gear casing 25 secured, as indicated at 26, to the outer side thereof. An offset recessed portion 27 of the casing 25 is pressed out from the body of the gear casing and is provided with an opening 28 for rigidly receiving a bearing sleeve 29 that supports therein a ball race 30 having a radially outwardly turned inner flange 32 and the radially inwardly turned outside flange 33. The inner end of the sleeve 29 abuts the inner flange 32 and the outside flange is flush with the outer end of the sleeve 29. Bearings 35 carried in a spacing ring 36 are confined in bearing relation in the sleeve 30 and rotatably support a hollow shaft 37 that is provided with a gear 38 rigidly carried upon its inner end. Its outer end has a polygonal portion 39. A split resilient ring 40 mounted under tension in a groove 42 peripherally formed in the sleeve 29 normally covers an opening 43 extending through the sleeve 29 and race 30 and communicates with the bearings. By rotatively sliding the ring in the groove the split portion thereof can be moved to register with the opening 43 through which the bearings can be lubricated.

A double crank 45 rigidly secured to the outer polygonal end of the shaft 37 by means of a screw 46, has a pair of manually operable roller handles 47 and its surfaces are streamlined (Figs. 3, 5 and 11) to minimize wind resistance especially as the line is being unwound when the crank is rotating at a rapid rate incidental to casting. This streamlining extends to angularly disposed handle portions 48 upon which the rollers 47 are journaled.

Figure 5:
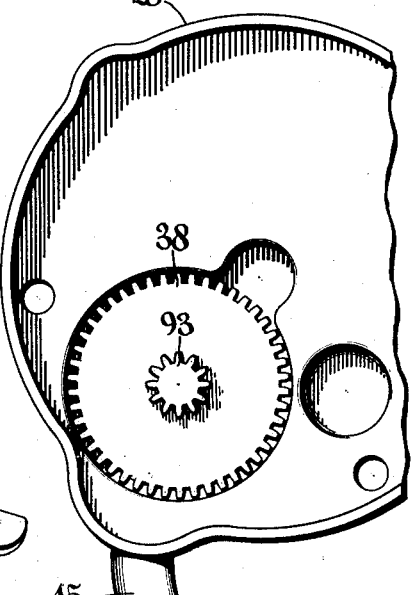
Fig. 5 is a portion complementary to that shown in Fig. 4 for assembly therewith in operative relation.

As best shown in Figures 4 and 5, the gear 38 is disposed in the offset recessed portion 27 of the casing and engages a relatively smaller gear 50 that is rigidly carried upon the outer end of a central spool 52. Bearing sleeves 53 and 55 mounted centrally in the plates 20 and 22 rotatably receive reduced bearing portions 56 and 57 of the spool. A shoulder 58 on the sleeve 53 abuts the outer surface of an offset or boss 59 formed in the plate 20. Shoulders 62 and 63 formed on the spool adjacent the inner sides of the plates 20 and 22 are provided with cupped discs or heads 65 and 66 secured in grooves 67 thereof and having their outwardly turned edges 68 abutting the plate in recesses 69 formed circumferentially adjacent to the outer marginal portions of the plates. A bearing washer 70 mounted upon the bearing portion 56 separates the shoulder 62 from the plate 20, and provides braking surfaces with the shoulder and plate.

A reversible ratchet 72 of conventional form is rigidly mounted upon the spool 52 adjacent the bearing portion 57 and a two-way cam pawl 73 pivoted upon a member 74 that is slidable in a slot 75 formed in the plate 22, engag the teeth of the ratchet. A split ring 76 of resilient material has its split portion 77 engaging opposite faces 78 of the cam head, and the pawl has its diametrically opposite portion secured, as indicated at 79, to the plate 22. This construction is generally termed a clicker, and the pawl can be disengaged from the ratchet 72 by sliding the member 74 in the slot 75.

The outer end of the bearing sleeve 55 has a cap 80 screw threaded thereon and a circular flange 82 of a smaller cup-shaped cap 83 is supported in a groove 85 formed in the inner wall of the cap 80. The outer transverse wall 86 of the cap 83 is provided with an opening 87 and a coil spring 88 has its opposite ends abutting the wall 86 and a floating plug 89, respectively. A second coil spring 90 has its opposite ends abutting the flange 82 and a washer 92 that rests upon the outer end of the sleeve 55 and surrounds the end of the spool bearing portion 57. By screwing the cap 80 upon the sleeve 55, the plug 89 frictionally contacts the end of the bearing portion 57 under the influence of the resilient pressure provided by the spring 88 to impart braking action upon the spool 52. Since the spring 90, which is normally under tension, tends to move the cap 80 outwardly, the latter is prevented from becoming unscrewed. Lubricant can be injected through the opening 87 for insuring proper rotary operation of the bearing portion 57 and of the relatively movable parts in the caps 80 and 83. By unscrewing the cap 80 a predetermined degree, the plug 89 will cease pressing upon the end of the bearing portion 57, and frictional action upon the brake surfaces of the washer 70 will be relieved.

Figure 6:
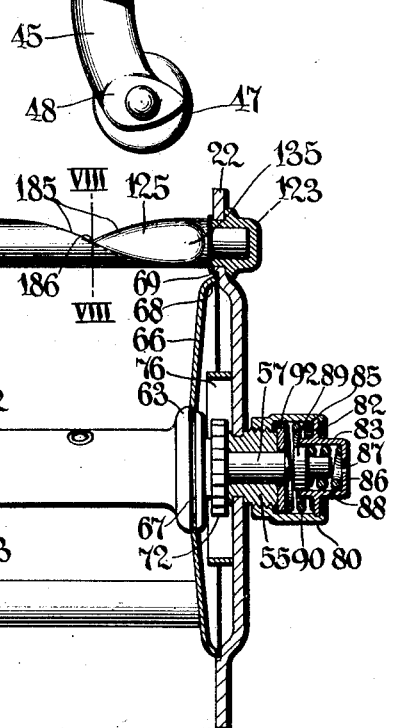
Fig. 6 is a section taken substantially along the line VI—VI of Fig. 4 and with portions of the reel shown in elevation.
Figure 7:
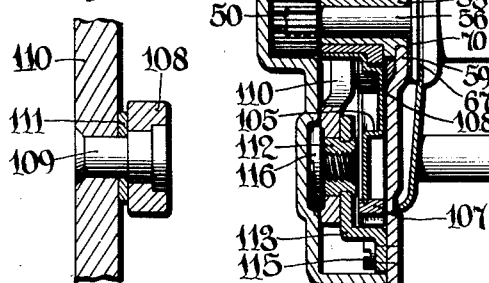
Fig. 7 is a fragmentary cross section on a larger scale, illustrating the mounting of a roller upon a segmental arm.

As best shown in Figures 4 and 6, a relatively small gear 93 is rigidly mounted coaxially upon the shaft 37 in slightly inwardly offset relation to the inner side of the gear 38 and engages a larger intermediate gear 94 which is mounted in side by side rigidly assembled relation with a smaller gear 96 and upon a common stub shaft 97. The latter shaft is journaled in the plate 20.

A relatively large cam gear 100 engages the small gear 96 and is provided with a central sleeve 102 bearing upon the outer surface of the bearing sleeve 53 and is supported for rotation thereon. An intermediate portion of the cam gear is composed of a pressed sheet metal section 103 having a flange 104 pressed out therefrom and rigidly secured upon the central sleeve 102. The outer side of the cam gear is provided with a cam channel 105 pressed out from the section of sheet material, and a peripheral edge portion 106 on the sheet material is rigidly secured, by spinning or otherwise, to the inner circumferential portion of a ring 107 that constitutes the gear upon which the gear teeth are formed.

A roller 108 mounted for operation in the cam channel 105 is rotatably carried upon a stud 109 rigidly secured upon an intermediate portion of a segmental gear arm 110, and a washer 111 is disposed between the roller and the surface of the arm. One end of the arm is provided with a bearing sleeve 112 that is rigidly secured to a bracket 113 for carrying the arm. Suitable fastening means 115 secure the bracket rigidly to the outer surface of the plate 20 and a screw 116 threaded into the sleeve maintains the end of the arm 110 thereon. The other end of the arm is provided with a gear segment 117 which engages a pinion 118 carried non-rotatably on one end of a level wind shaft 120.

Figure 8:
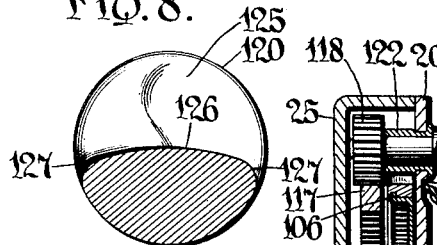
Fig. 8 is a cross section, taken substantially along the line VIII—VIII of Fig. 6.

The end portion of the shaft 120 adjacent the pinion is carried in a bearing sleeve 122 that is rigidly mounted in the plate 20, and the other end of this shaft is rotatably carried in a bearing cup 123 that is rigidly mounted in the plate 22. A spiral cut 125 extending substantially the distance from one plate 20 to the other plate 22 traverses approximately seven-eighths of a turn about the circumference of the shaft 120 and the cut extends approximately one-half the distance through the shaft with respect to the overall thickness thereof. As best shown in Fig. 8, the wall 126 of the cut, at a typical cross section thereof, slopes slightly toward the periphery of the shaft and rounded wall edges 127 are formed to complete the desired face contour of the spiral cut. In outline the cross sectional contour of the spiral shaft is substantially semi-circular.

When the crank 45 is rotated in a clock-wise direction, as viewed in Fig. 1, the gears 38 and 50 rotate the reel spool 52 in such direction as to reel in and wind the line 130 thereon. At the same time, the train of gears 93, 94, 96 and 100 are rotated by the crank 45 and the cam roller 108 travels about the cam channel 105 to oscillate the segmental gear arm 110. It will be observed that the cam channel is heart shaped and is provided with a high point 132 and a low point 133. When the cam gear 100 is rotated in either direction, the roller 108 travels uniformly and continuously from the low point to the high point and vice versa of the cam channel to move the gear segment in predetermined cycles of oscillation. The cam and gear are so proportioned that movement from the high point to the low point, or from the low point to the high point, causes approximately seven-eighths of a complete rotation of the pinion 118 and, consequently, of the spiral level wind shaft 120.

Since the spiral cut 125 traverses approximately seven-eighths of the circumference of the shaft, the line 132 lying upon the surface of the shaft defining the cut 125, in the manner shown in Fig. 2, will be shifted by the spiral of the shaft from side to side in response to the oscillatory movement of the pinion 118 and gear segment 117. The spiral surface in fact provides a cam like action upon the line in shifting it. The ends of the spiral cut are sloped outwardly, as indicated at 135, adjacent the ends of the shaft 120 into a circular circumference to prevent accidental slipping on the line from the end portions of the spiral cut, although, under ordinary conditions the reverse turning movement of the shaft and the spiral portion after shifting the line toward one shaft end, will automatically start the shifting of the line in the opposite direction. This operation occurs incidentally to each cycle on oscillation of the spiral shaft 120, and regardless of whether the reel crank is rotated in clock-wise or counter-clock-wise directions.

Figure 9:
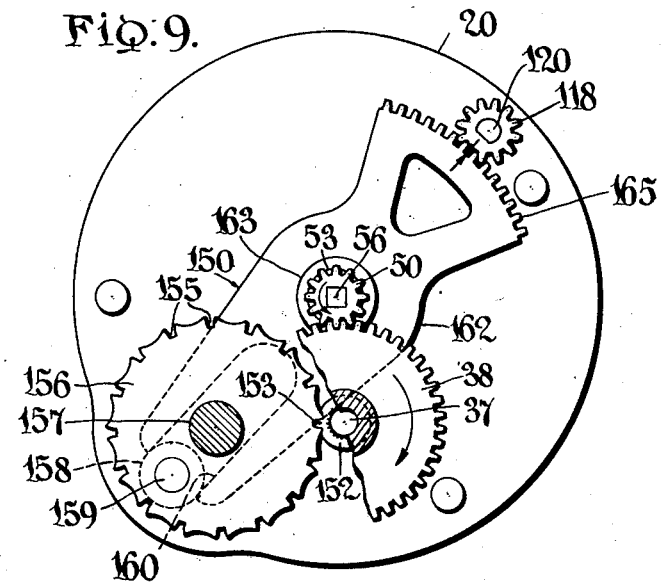
Fig. 9 is an elevation of another form of level wind mechanism incorporated in the reel.

In the form of the invention shown in Fig. 9, there is provided the same type of reel rotating mechanism as that previously described, and hence, identical structural elements are designated by the same reference characters. Another type of spiral shaft oscillating mechanism 150 shown in this figure includes a gear element 152 having only one tooth 153 and which, in place of the gear 93 previously described, is mounted with the gear 38 rigidly upon the shaft 37. This tooth 153 successively engages notches 155 of a wheel 156 which is carried for rotation upon a stud shaft 157 mounted in the outer casing wall 25. Thus upon each revolution of the tooth 153 the wheel 156 is rotated through a predetermined angle.

A roller 158 mounted eccentrically upon the wheel 156 is disposed in a slot 160 formed in one end portion of an oscillating bar 162 which has an intermediate bearing boss 163 rotatably carrying the bar upon the bearing sleeve 53. At the end of the bar 162 opposite the slot 160 a gear segment 165 is formed for engagement with the pinion 118.

Upon rotation of the gear 38 the wheel 156 is rotated intermittently in response to the tooth 153 successively engaging in the notches 155, and the eccentrically mounted roller 158 operating in the slot 160 causes oscillation of the bar 162 whereby the pinion 118 and spiral shaft 120 are oscillated in properly timed relation to insure even or level winding of the fishing line upon the spool of the reel.

Figure 10:
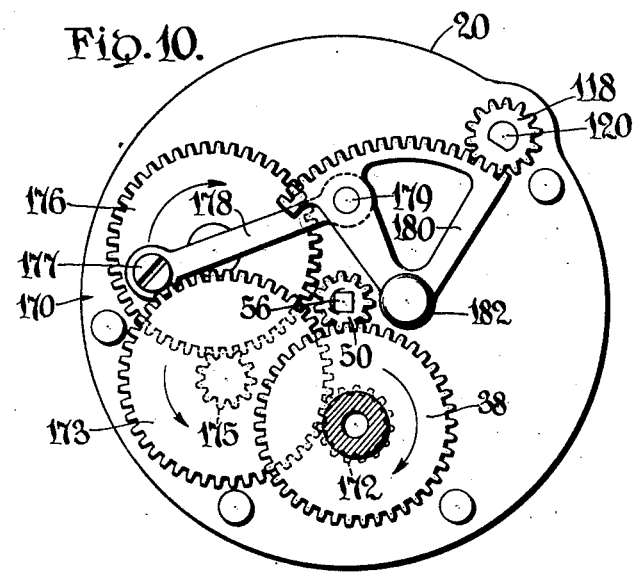
Fig. 10 is an elevation of still another form of level wind mechanism incorporated in the reel.

Referring to Fig. 10, an additional form of the invention is shown and in this figure like Fig. 9, the structural elements previously described are designated by the same reference characters. In this form of the invention a spiral shaft oscillating mechanism 170 includes a gear 172 corresponding to, and mounted in the same manner as, the gear 93 upon the shaft 37 and meshes with a larger gear 173 that has a smaller gear 175 coaxially carried in rigid relation therewith. These gears 173 and 175 are rotatably mounted in the plate 20 and the smaller gear 175 meshes with a crank gear 176 that is also rotatably carried in plate 20.

A crank pin 177 pivotally supports one end of a pitman 178 and the other end of the pitman has a pivotal connection 179 eccentrically of a gear segment 180 that has a bearing connection 182 in the plate 20. The gear segment 180 normally engages the pinion 118 for driving the spiral shaft 120. By rotating the gear 38 in either direction in the manner previously described the train of gearing 172, 173, 175 and 176 oscillates the gear segment 180 and the spiral shaft 120 is oscillated in properly timed relation to insure even or level winding of the fishing line upon the spool of the reel.

From the foregoing description, it will be apparent that the invention involves a structure in which the level wind spiral shaft operates efficiently without imposing appreciable drag upon the reel gears and which is extremely simple and positive in its operation. The spiral reversible shaft is geared down greatly from the crank revolution of the reel, and hence, does not interfere with the line when it is played out very rapidly incidental to casting. Thus the structure tends to increase the casting distance over the conventional types of reels and facilitates the reeling in operations.

Although seven-eighths of a revolution of the level wind shaft 120 has been designated as desirable for proper level winding of the fishing line in the construction described, it is to be understood that the spiral cut in the shaft can be made more or less than seven-eighths of the shaft circumference and then the timing of the mechanism can be altered to provide the proper shaft rotation which may also be more or less than seven-eighths of a revolution.

It will be noted that the line contacts the spiral surface in its movement from side to side at a location approximately half way through the overall diameter of the spiral shaft and that the line is urged axially along the shaft by one of the rounded edges 127 in one direction of rotation, while it is held against over running by the other rounded edge. This action occurs regardless of the direction of rotation of the spiral shaft until the line reaches the reversing slopes 135. Thus the rounded edges of the spiral surface, as viewed from the direction of the spool along the fishing line resting upon such surface, constitute converging guides 185 at approximately the apex 186 of which the line is disposed for level winding upon the spool. In other words, a shifting valley-like track for the line is formed by the spiral edges and the line always tends to remain at the shifting apex or bottom of the track which is approximately across the axis of the spiral shaft.

Although several forms of the invention have been shown and described in detail, it will be apparent to those skilled in the art that the invention is not so limited, but that various changes may be made therein without departing from the spirit of the invention or from the scope of the appended claims.

I claim:

1. In a fishing reel structure, a driving crank, a driven spool for receiving a fishing line in wound relation thereon, means for driving the spool from the crank, an oscillatable member having a substantially spiral surface, means for mounting the member adjacent the spool, and means for driving the oscillatable member from the driving crank whereby a fishing line extending from the spool over the spiral surface is movable back and forth in guided level winding relation along the length of the spool.

2. In a fishing reel structure, a driving crank, a driven spool for receiving a fishing line in wound relation thereon, means for driving the spool from the crank, a reversible spiral shaft for receiving the line in contact with the spiral surface thereof, means for mounting the spool and shaft in substantially parallel relation, motion translating means connecting the crank to the spiral shaft whereby continuous rotation of the crank transmits oscillatory motion to the shaft through predetermined degrees of rotation thereof to shift the line back and forth in level wind relation along the length of the spool.

3. In a fishing reel structure, a driving crank, a driven spool for receiving a fishing line in wound relation thereon, means for driving the spool from the crank, a reversible spiral shaft for receiving the line in contact with the spiral surface thereof, the depth of the spiral of the shaft being substantially equal to the radius of the shaft, means for mounting the spool and shaft in substantially parallel relation, motion translating means connecting the crank to the shaft whereby continuous rotation of the crank transmits oscillatory motion to the shaft through predetermined degrees of rotation thereof to shift the line in level wind relation along the length of the spool.

4. In a fishing reel structre, a driving crank, a driven spool for receiving a fishing line in wound relation thereon, means for driving the spool from the crank, a reversible spiral shaft for receiving the line in contact with the spiral surface thereof, said spiral extending less than one complete turn about the circumference of the shaft, means for mounting the spool and shaft in substantially parallel relation, motion translating means connecting the crank to the shaft whereby continuous rotation of the crank transmits oscillatory motion to the shaft through predetermined degrees of rotation thereof to shift the line uniformly in reversing relation from end to end of the spool.

5. In a fishing reel structure, a driving crank, a driven spool for receiving a fishing line in wound relation thereon, means for driving the spool from the crank, a reversible spiral shaft for receiving the line in contact with the spiral surface thereof, the ends of the spiral sloping outwardly to the circumferential surface of the shaft adjacent its ends, the depth of the spiral of the shaft being substantially equal to the radius of the shaft whereby continuous rotation of the crank transmits oscillatory motion to the shaft through predetermined degrees of rotation thereof to shift the line uniformly in reversing relation from end to end of the spool.

6. In a fishing reel structure, a driving crank, a driven spool for receiving a fishing line in wound relation thereon, means for driving the spool from the crank, a reversible spiral shaft for receiving the line in contact with the spiral surface thereof, the shaft being substantially semi-circular in cross section means for mounting the spool and shaft in substantially parallel relation, motion translating means connecting the crank to the shaft whereby continuous rotation of the crank transmits oscillatory motion to the shaft through predetermined degrees of rotation thereof, to shift the line uniformly in reversing relation from end to end of the spool.

7. In a fishing reel structure, a driving crank, a driven spool for receiving a fishing line in wound relation thereon, means for driving the spool from the crank, a reversible spiral shaft substantially semi-circular in cross section for receiving the line in contact with the spiral surface thereof, the marginal portions of the spiral surface being rounded to present a smooth surface for the line, means for mounting the spool and shaft in substantially parallel relation, motion translating means connecting the crank to the shaft whereby continuous rotation of the crank transmits oscillatory motion to the shaft through predetermined degrees of rotation thereof to shift the line uniformly in reversing relation from end to end of the spool.

8. In a fishing reel structure, a driving crank, a driven spool for receiving a fishing line in wound relation thereon, means for driving the spool from the crank, an oscillatable member having a substantially spiral surface for receiving the line in contact therewith, an actuating member engaging the oscillatable member, means for pivotally supporting the actuating member adjacent the oscillatable member, and means connecting the crank to the actuating member for imparting oscillatory motion to the latter and for rotating the oscillatable member through predetermined angles of oscillation at rates of rotation less than the rate of rotation of the crank.

9. In a fishing reel structure, a driving crank, a driven spool for receiving a fishing line in wound relation thereon, means for driving the spool from the crank, an oscillatable member having a substantially spiral surface for receiving the line in contact therewith, an actuating member engaging the oscillatable member, means for pivotably supporting the actuating member adjacent the oscillatable member, a gear having an outer ring provided with gear teeth, said gear including a pressed sheet metal plate rigidly mounted in the ring, said sheet metal plate having a cam track formed therein, means for rotatably supporting the gear and spool adjacent the crank and actuating member, a cam member on the actuating member engaging the cam track, driving means between the crank and gear whereby rotation of the crank imparts oscillatory motion to the actuating member and to the oscillatable member.

10. In a fishing reel structure, a driving crank, a driven spool for receiving a fishing line in wound relation thereon, means for driving the spool from the crank, an oscillatable member having a substantially spiral surface for receiving the line in contact therewith, an actuating member having means at one end for engaging the oscillatable member, said actuating member having a slot at its other end, a crank wheel having a series of notches about its circumference, a crank pin on the crank wheel engaging in the slot of the actuating member, means for rotatably supporting the crank wheel, a gear having a driving connection to the crank and engageable with the notched wheel whereby rotation of the crank causes the crank wheel to oscillate the actuating member and oscillating member.

11. In a fishing reel structure, a driving crank, a driven spool for receiving a fishing line in wound relation thereon, means for driving the spool from the crank, an oscillatable member having a substantially spiral surface for receiving the line in contact therewith, an actuating member engaging the oscillatable member, means for pivotally supporting the actuating member, a crank gear wheel having a pitman connection to the actuating member, a train of reduction gearing connected between the crank gear wheel and the crank whereby rotation of the crank rotates the crank gear wheel at relatively less speed for imparting a predetermined oscillatory motion to the oscillatable member.

12. In a fishing reel structure, a driving crank, a driven spool for receiving a fishing line in wound relation thereon, means for driving the spool from the crank, a pair of spaced end plates for rotatably supporting the spool, said spool and one of the plates having contiguous braking means, a cap having a screwthreaded connection upon one of the plates, a cup shaped member mounted in the cap, an element movable into contact with the end of the spool, and resilient means in the cup shaped member for resiliently urging the element against the end of the spool when the cap is screwed a predetermined degree upon its connection whereby said braking means are pressed together.

13. In a fishing reel structure, a driving crank, a driven spool for receiving a fishing line in wound relation thereon, means for driving the spool from the crank, an oscillatable member having a substantially spiral surface, opposite edges of the spiral surface cooperating to define converging guiding track means as viewed from the spool for maintaining the line against accidental shifting from the guiding track of the converging edges, means for mounting the member from the driving crank whereby a fishing line extending from the spool over the spiral surface is movable back and forth in guided level winding relation along the length of the spool.

14. In a fishing reel having means for winding a fishing line thereon, a level wind spiral shaft for guiding the fishing line alternately from end to end of the reel, the spiral shaft presenting a shifting valley-like contour substantially to the axis of the fishing line to prevent said line from being displaced laterally from either side from the valley-like contour.

15. In a fishing reel, a driving crank for winding a fishing line upon the reel, a level wind spiral shaft having a driving connection to the crank, the spiral shaft having portions presenting a shifting valley-like contour as viewed substantially along the axis of the fishing line to prevent said line from being displaced laterally from either side from the valley-like contour.

16. In a fishing reel having means for winding a fishing line thereon, a level wind member for guiding the fishing line alternately from end of the reel, said member having converging camming surfaces presenting a shifting apex for receiving the fishing line whereby the fishing line is prevented from riding up the converging surfaces in its shifting movement from end to end of the reel.

17. In a fishing reel, a driving crank provided with means for winding a fishing line thereon, a level wind member having a driving connection to the crank, said member having converging camming surfaces presenting a shifting apex for receiving the fishing line whereby the fishing line is prevented from riding up the converging surfaces in its shifting movement from end to end of the reel.

18. A level wind mechanism for fishing reels comprising a rotatable member having guiding surfaces defining a shifting guide for shifting a fishing line laterally from end to end of a fishing reel, said surfaces maintaining the fishing line against lateral displacement in either direction during the lateral line-guiding movements, and means for driving the rotatable member.

19. A level wind mechanism for fishing reels comprising a rotatable member for receiving a fishing line in contact therewith substantially transversely with respect to the axis of rotation of said member, a guiding surface formed on the rotatable member and presenting in outline oppositely inclined portions as viewed substantially transversely thereof along the length of the fishing line, said oppositely inclined portions being successively shiftable as to position axially of the rotatable member during rotation of the latter and maintaining the same outline of oppositely inclined portions whereby the fishing line contacting the surface between the inclined portions is moved axially of the rotatable member and held against lateral displacement from between said inclined portions.

HYLA F. MAYNES.